July 29, 1958 W. W. STUNKEL 2,844,881
MICROMETER BORE GAUGE
Filed June 28, 1955
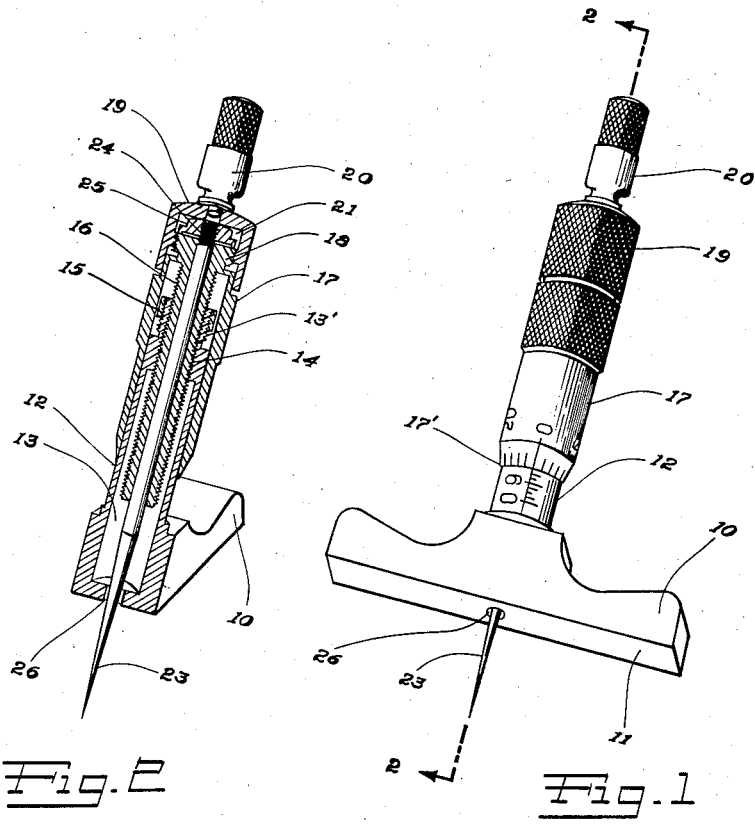
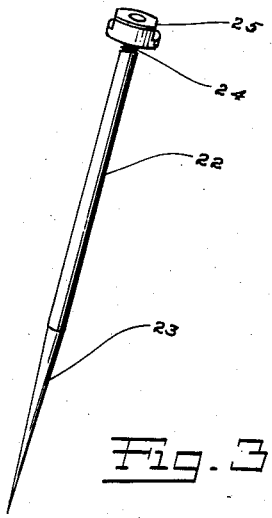
INVENTOR.
Werner W. Stunkel
BY
HIS ATTORNEY

United States Patent Office 2,844,881
Patented July 29, 1958

2,844,881

MICROMETER BORE GAUGE

Werner W. Stunkel, Skokie, Ill.

Application June 28, 1955, Serial No. 518,529

2 Claims. (Cl. 33—178)

This invention relates to a new and useful improvement in a micrometer bore gauge and has for its principal object a device of the character described which is simple in construction and economical in manufacture.

Another object of this invention is in the provision in a device of this character whereby the diameter of a bore may be easily and accurately measured.

Still another object of this invention is in the provision in a device of this character whereby a bore having a diameter in the range from .1 to .0001 of an inch may be accurately measured.

Another and equally important object of this invention is in the provision in a device of this character whereby the measuring rod may be readily removed from the gauge and replaced.

Yet another and equally important object of this invention is in the provision of a device of this character whereby the measuring rod may be adjusted to compensate for wear without affecting its true measurement.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my invention;

Fig. 2 is a side elevational detail sectional view taken substantially on line 2—2 of Fig. 1;

Fig. 3 is an elevational view of a measuring rod as employed in my gauge.

Referring more particularly to the drawings, Fig. 1 shows the micrometer bore gauge consisting of a housing 10 having a flat underside 11. The housing 10 is provided with a barrel 12 intermediate the ends of the housing 10 and perpendicular to the flat underside 11 as shown in Figs. 1 and 2.

This barrel 12 is provided with an offset center bore 13. The barrel 12 at its free end is externally threaded as at 13' and internally threaded as at 14. The threaded portion 13' is receptive of an adjusting nut 15 while the threaded portion 14 will receive a like threaded sleeve 16 of a thimble 17. The barrel has engraved thereon a vernier scale over which is adapted to pass the tapered end 17' of the thimble 17. The above referred to scale is a standard vernier scale and will be hereinafter more fully described. The arrangement is such that when the thimble 17 is rotated, the sleeve 16 will thread itself upon the threaded portion 14 of the barrel 12, with the sleeve 16 passing into the offset center bore 13 of the barrel 12 as shown in Fig. 2.

The thimble 17 at its top is provided with a threaded projection 18 upon which is threaded a cap 19. This cap 19 is provided with a finger piece 20 extending longitudinally therefrom as shown in Figs. 1 and 2. The cap 19 is adapted to be threaded upon the projection 18 in such a manner so as to provide a chamber 21 between the cap 19 and the end of the projection 18 as shown in Fig. 2.

Fig. 3 discloses a gauge rod 22 having one end tapered and the opposite end threaded as at 24. Upon this threaded end 24 is screwed an adjusting nut 25.

The arrangement is such that the rod 22 may be inserted through the top of the bore of the sleeve 17 until the bottom of the nut 25 rests on the top of the projection 18. The tapered end 23 of the rod 22 will pass out an aperture 26 formed in the housing 10 and having open communication through the flat underside 11 as shown in Figs. 1 and 2. The bottom of the nut 25 will rest in the chamber 21 between the cap 19 and the top of the projection 18. As the thimble 17 is threaded upon the barrel 12, the thimble 17 will move in the direction of the base of the housing 10 and with it will move the rod 22 with its tapered end 23 passing out the aperture 26.

In actual operation, the thimble 17 may be rotated until the full tapered end 23 of the rod 22 is projecting out of the aperture 26. The tapered end 23 of the rod 22 is then inserted into the bore or hole which is to be measured. It will pass into the bore until the tapered sides of the rod 22 bind on the side walls of the bore to be measured. At this point the thimble 17 may be rotated in an opposite direction until the flat underside 11 comes into confronting relation with the piece of material surrounding the bore which is to be measured.

As hereinbefore mentioned, the barrel 12 as well as the thimble 17 is provided with a graduation scale. The tapered end of the rod 22 is exactly one inch in length. The scale on the barrel 12 is scored with 10 major graduations and scored with 3 minor graduations between successive major graduations. Therefore, when the thimble 17 is rotated so that it passes from the zero graduation to the No. 1 or first major graduation, the rod has protruded 1/10 of an inch out of the aperture 26. The bore or hole that would be measured at its protrusion would be .01 of an inch in diameter. Thus after the rod 22 passes out of the aperture 26 the distance of one inch of its length, the hole or bore measured thereby would be .1 of an inch. The scale on the thimble 17 consists of 25 graduations, with each graduation equal to .0001. As such, one full revolution of the thimble 17 about the barrel 12 will be equal to .0025 or one of the minor gradations on the scale of the barrel 12.

If in manufacture, the point of the rod 22 is in variance with the scales, the rod 22 by adjustment of the nut 25 thereof may be corrected so that the proper reading on the scale may be had. When the rod 22 is fully within the barrel 12, the point thereof should be in the same corresponding plane as the flat underside 11 of the housing 10. The scales of the barrel 12 as well as the thimble 17 should be at 00. Thus it is a simple matter to check the accuracy of the tapered end 23 of the rod 22.

From the foregoing it is readily seen that the taper of the end 23 of the rod 22 over its one inch of length will be in direct proportion to the scales. The taper of the rod 22 must be .1 of an inch over the 1 inch length. With that in mind, it is understood that the diameter of the bore or hole to be measured and the rod therefor could vary. This is to say that if it was desired to employ a rod for measuring a bore or hole from .1 to .2, then each major graduation of the scale is equal to .01 of an inch, but in reading the measurement it would be read as .110. Each minor graduation is equal to .0025, but would be read .1025, and each of the 25 graduations on the thimble 17 is equal to .0001, and would be read as 1001. The only structural change required for the use of the above described rod and its measurement would be that the aperture 26 and the sleeve 16 be of such a size to accept a rod having a diameter of $\frac{2}{10}$ of an inch.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A micrometer bore gauge comprising an elongated body having a flat underside, a barrel extending laterally from said body, a thimble having a diameter greater than the diameter of said barrel, and positionable over the outer circumference of said barrel, an inner sleeve carried by said thimble and engageable with an inner portion of said barrel for rotatably connecting said thimble to said barrel for longitudinal movement thereover, a measuring rod freely carried by said thimble and projecting into said barrel, said rod tapered over a predetermined length of one end with said end adapted to be projected out of an aperture formed in said underside of said body when said thimble is moved over said barrel, said barrel and said thimble bearing scales of graduations, with the graduations of each of said scales corresponding to a frictional value of the diameter of the tapered end of said rod and with the graduations of the scale on said barrel being in direct proportion to the length of displacement of the tapered end of said rod from said barrel, and an adjusting nut threadably carried at one end of said rod adjacent to and engageable with one free end of said thimble for adjusting the amount of displacement of said tapered end of said rod relative to said barrel and the scale thereon.

2. A micrometer bore gauge comprising an elongated body having a flat underside, a barrel extending laterally from said body, a thimble having a diameter greater than the diameter of said barrel, and positionable over the outer circumference of said barrel, an inner sleeve carried by said thimble and engageable with an inner portion of said barrel for rotatably connecting said thimble to said barrel for longitudinal movement thereover, a measuring rod freely carried by said thimble and projecting into said barrel, said rod tapered over a predetermined length of one end with said end adapted to be projected out of an aperture formed in said underside of said body when said thimble is moved over said barrel, said thimble movable longitudinally over said barrel a distance equal to the length of the tapered end of said rod, said barrel and said thimble bearing scales of graduations, with the graduations of each scale corresponding to a fractional value of the diameter of the taper relative to the displacement of said rod from said barrel, and means for adjustably connecting said rod to said thimble; said last named means including an adjusting nut threadably carried at one end of said rod adjacent to and engageable with one free end of said thimble for selectively positioning said rod relative to said thimble within said barrel.

References Cited in the file of this patent

UNITED STATES PATENTS

| 490,860 | Snoeck | Jan. 31, 1893 |
| 1,922,758 | Christopherson | Aug. 15, 1933 |
| 2,445,060 | Gearhart | July 13, 1948 |
| 2,786,277 | Zifferer | Mar. 26, 1957 |

FOREIGN PATENTS

| 237,646 | Switzerland | Aug. 16, 1945 |
| 293,460 | Switzerland | Dec. 16, 1953 |